United States Patent [19]

Epstein et al.

[11] Patent Number: 5,347,652
[45] Date of Patent: Sep. 13, 1994

[54] METHOD AND APPARATUS FOR SAVING AND RETRIEVING FUNCTIONAL RESULTS

[75] Inventors: David A. Epstein, Ossining, N.Y.; Glenn G. Gilley, Chapel Hill, N.C.; Kevin P. McAuliffe, Peekskill, N.Y.

[73] Assignee: International Business Machines Corporation, Armonk, N.Y.

[21] Appl. No.: 721,807

[22] Filed: Jun. 26, 1991

[51] Int. Cl.$^5$ ............................................. G06F 15/40
[52] U.S. Cl. ................................... 395/600; 395/425; 364/736; 364/974; 364/282.1; 364/224; 364/DIG. 1
[58] Field of Search .................. 364/DIG. 1, DIG. 2, 364/746, 736; 395/200, 800, 400, 600, 425

[56] References Cited

U.S. PATENT DOCUMENTS

| | | | |
|---|---|---|---|
| 4,281,391 | 1/1974 | Huang | 364/746 |
| 4,611,280 | 9/1986 | Linderman | 364/200 |
| 4,974,191 | 11/1990 | Amirghodsi et al. | 364/900 |
| 5,091,852 | 2/1992 | Tsuchida et al. | 395/600 |
| 5,123,101 | 1/1992 | Sindhu | 395/400 |

FOREIGN PATENT DOCUMENTS

0149067A3 7/1985 European Pat. Off. .

OTHER PUBLICATIONS

W. Kammerer, "Proceedings of the 4th Workshop on Mathematical Aspects of Computer Science", Journal of Information Processing and Cybernetics, 1990, vol. 26, No. 1-2, May 13, 1988, pp. 102–117.
Operations Research Letters, "A Compact Hash Function for Paths in Pert Networks" vol. 3, No. 3, Aug. 1984, Netherlands, pp. 137–140.
Banerjee et al., "Queries in Object-Oriented Databases" Proc 4th Intl. Conf. on Data Eng, Los Angeles, Calif. Feb. 1988 pp. 31–38.
Korth & Silberschatz, Database System Concepts, McGraw-Hill, (New York, 1986) pp. 45–105.

Primary Examiner—Thomas C. Lee
Assistant Examiner—Paul R. Lintz
Attorney, Agent, or Firm—Perman & Green

[57] ABSTRACT

Method and apparatus for use in a digital data processing system that evaluates functional networks. A method operates to assign a unique signature to each input constant of the network, assign a unique signature to each output of a network Function, and to store each of the constants and function outputs along with their assigned signatures. The signatures operate as an access key to the associated stored constants and function outputs, thereby eliminating a requirement to reevaluate a Function if its outputs already exist. A storage element, or Dictionary (20), stores data units, such as input data, intermediate values, and/or pointers to same, each with a unique signature. The storage element, in concert with a Dictionary Controller (18), provides for the deletion of a stored data unit that is associated with a specified signature and the retrieval of a stored data unit that is associated with a specified signature. Preferably, the signatures are generated from a combination of constant and Function attributes and values and are each uniquely encoded by a CRC generator (14).

28 Claims, 4 Drawing Sheets

FIG. I

DIRECTED ACYCLIC GRAPH (DAG)

METHOD AND APPARATUS FOR SAVING AND RETRIEVING FUNCTIONAL RESULTS

FIELD OF THE INVENTION

This invention relates generally to data processing methods and apparatus and, in particular, to methods and apparatus for managing input data and intermediate results during the execution of a functional network, such as a Directed Acyclic Graph (DAG).

BACKGROUND OF THE INVENTION

As depicted in FIG. 1, a functional network may be represented as a DAG that is constructed of interposed levels of data and functional nodes. The boxes labelled A, B, D, E, F, G, and H correspond to functional nodes, or transformations, of the DAG. The circles labelled x, y, and z correspond to inputs to the DAG. The circles labelled a, b0, b1, d, e, f, and g correspond to values derived as intermediate results during the execution of the functional nodes. It should be realized that the functional network depicted in FIG. 1 represents a typical, and not a limiting, structure of a DAG.

In many conventional graphics and analysis systems data is operated upon by a set of such transformations so as to arrive at a desired result. Often, the transformations are repeated several times, while altering one or more parameters that define the transformations. After the inputs to the transformations are altered, a recomputation of the data becomes necessary to reflect the alteration.

A problem is encountered if intermediate values obtained from one computation, such as those represented by the circles a, b0, b1, and d, are not retained, in that the entire set of transformations must be recomputed. This is obviously undesirable in that it is computationally expensive.

If the intermediate values are maintained, then another problem is presented in how to most efficiently manage the retained intermediate values. In order to be of practical use, the management technique should in itself not be computationally expensive. Also, the technique should preferably operate in an efficient manner such that a determination of the existence of, and access to, the input data and intermediate values can occur in a rapid manner.

It is thus one object of the invention to provide an efficient technique for managing data inputs and intermediate values during the execution of a functional network.

It is a further object of the invention to provide an efficient technique to compute unique signatures, each of which is associated with a data input or an intermediate value, the signatures being employed subsequently to determine if the data input or intermediate value exist and, if so, to access same.

It is a still further object of the invention to provide method and apparatus that represents the result of a computation as a function of the inputs to the computation.

SUMMARY OF THE INVENTION

The foregoing and other problems are overcome and the objects of the invention are realized by method and apparatus for managing input data and intermediate values calculated during the execution of a functional network. The invention employs a technique whereby unique, readily computable signatures are assigned to input data and intermediate values. Subsequently, these signatures are used to determine whether the input data or intermediate values exist and, if so, to access them.

The method and apparatus of the invention function independently of any hardware caching mechanisms that operate on either virtual or physical memory addresses. The method and apparatus of the invention also function independently of any hardware and software memory management mechanisms, such as paging, swapping, and segmentation, which typically operate on memory addresses rather than functional derivations. Furthermore, the method and apparatus of the invention differ from conventional, memory-oriented caching and memory management schemes, which typically manage only fixed-size, contiguous areas of memory, in that there is provided access to arbitrary data items such as individual bytes, words, lists, or complex, hierarchical, linked data structures.

The method and apparatus of the invention employ a combination of three elements: an assignment of a unique signature to each constant value, an assignment of a unique signature to each output of a function, and the storage of each of the constants and function outputs along with their assigned signatures. The signatures operate as an access key to the associated stored constants and function outputs.

A storage element, or dictionary, employed by the invention stores data units, such as input data, intermediate values, and/or pointers to same, each with a unique signature. The storage element further enables the deletion of a stored data unit that is associated with a specified signature and the retrieval of a stored data unit that is associated with a specified signature.

In accordance with the invention there is disclosed, for use in a digital data processing system of a type that repetitively evokes a set of Functions to process data, including one or more constants, a method that includes the following steps. A first step evaluates a network constant to determine identifying characteristics thereof. A second step combines the characteristics with the value of the constant. A third step encodes the combination to obtain a Constant signature. A fourth step stores the Constant signature with a representation of the value. A fifth step evaluates a Function to determine identifying characteristics of an output of the Function. A sixth step combines the characteristics with an identification of the Function. A seventh step encodes the combination to obtain a Function signature. An eighth step stores the Function signature with a representation of the output of the Function.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
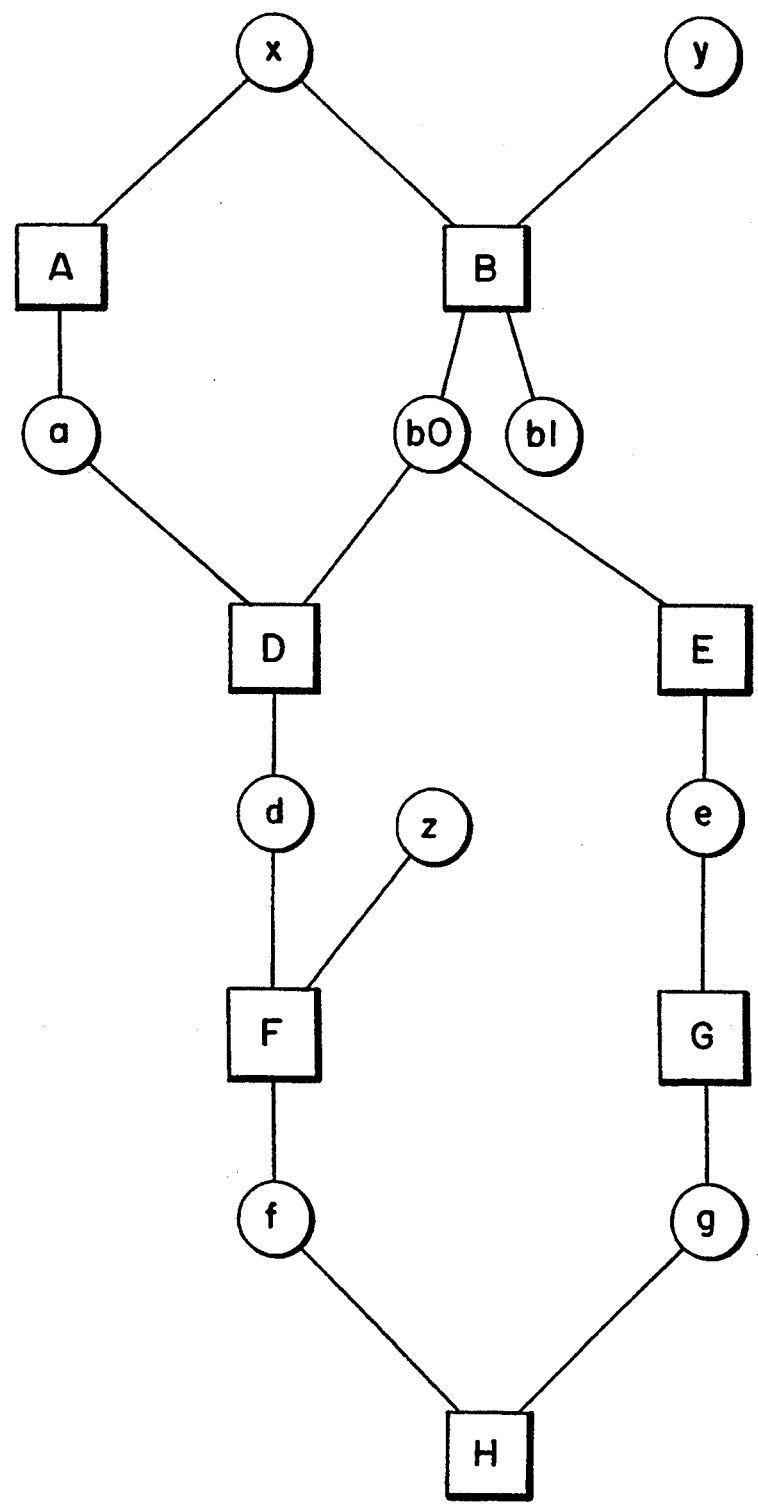
FIG. 1 depicts an exemplary functional network.
Figure 2:
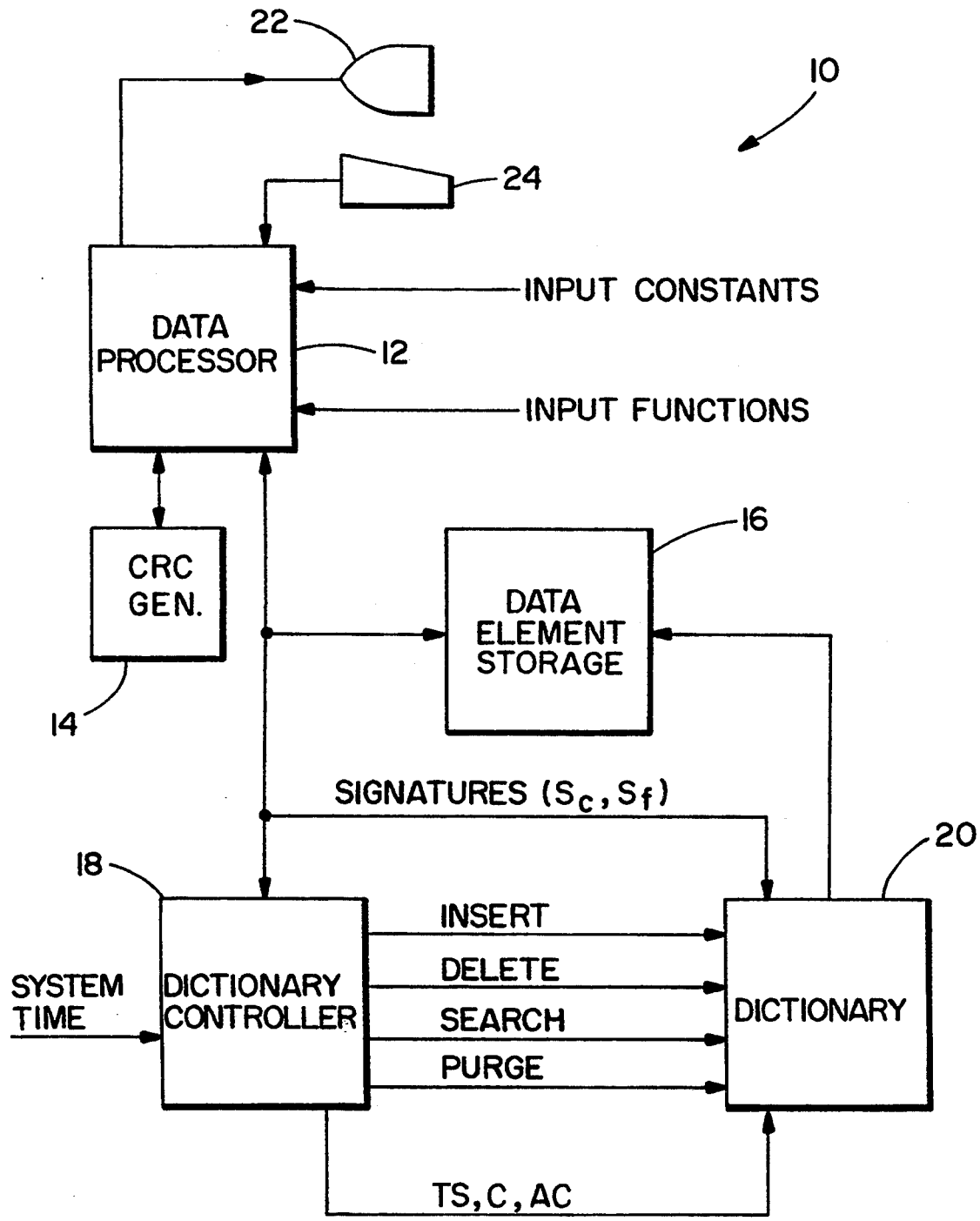
FIG. 2 is a block diagram of a data processing system constructed and operated in accordance with the invention.

Referring to FIG. 2 there is illustrated in block diagram form a data processing system 10 that operates in accordance with the teaching of the invention. System 10 includes a data processor 12. Data processor 12 may be embodied by any suitable data processing apparatus such as a microprocessor or an assemblage of microprocessors interconnected together as a multiprocessor. As will be described in detail below, a function of the data processor 12 is to receive input constants and input functions so as to evaluate a functional network of a type represented by the DAG of FIG. 1. In accordance with an aspect of the invention, data processor 12 is bidirectionally coupled to an encoder, preferably a cyclic redundancy check (CRC) generator 14. In other embodiments of the invention the encoder may operate in accordance with the well-known Data Encryption Standard as described in FIPS Publication 46, Jan. 15, 1977, or with any suitable technique for obtaining a unique or semi-unique representation of an input. Also coupled to data processor 12 is a data element storage (DES) 16, which may be embodied in a semiconductor memory, a disk, or a tape memory system. The DES 16 is employed for storing constant data, results, and partial results, including intermediate values, that are input to or calculated during the evaluation of the functional network. Also coupled to data processor 12 is a Dictionary Controller 16 having a plurality of control outputs coupled to a Dictionary 20. The data processor 12 further has an output coupled to Dictionary 20 for providing signatures thereto, the signatures each being computed, in a manner described below, and then encoded by the CRC generator 14. As will be described, the signatures are stored within the Dictionary 20 as "keys", each of the keys being associated with an element of data. The element of data may be a number, or a pointer to an array of data, or a pointer to any hierarchical linked data structure. In a preferred embodiment of the invention, the Dictionary 20 is embodied as a hash table having a plurality of hash cells that are addressed by the signatures. The use of a hash table is presently preferred in that a constant search time is obtained. It should be realized however that the Dictionary 20 may be embodied in other suitable data structures, including, but not limited to, a linear array, a tree structure, or a linked list.

The Dictionary Controller 18 is employed to insert, delete, search, and purge the stored signatures, or keys.

The system 10 further includes a display, such as a high resolution graphics display 22, upon which textual and graphical data is displayed to a user of the system. System 10 also includes a user input device, such as a keyboard 24, whereby the user is enabled to enter commands and instructions into the data processor 12, including commands that cause the data processor 12 to execute a functional network of the type shown in FIG. 1. These latter two components 22 and 24 are conventional in nature and will not be described in further detail.

The above described and other aspects of the invention are now described in greater detail.

SIGNATURE DETERMINATION

Two methods of signature determination are employed by the data processor 12. A first method is applied to Input Constants to determine a first Signature ($S_c$). Input Constants are the inputs to the functional network represented in FIG. 1 by the circles x, y, and z. A second method is applied to Functional Results to determine a second Signature ($S_f$), which operates on the signatures of the Function inputs, as well as other relevant data, as will be described.

The signature generators are structured in such a manner that Input Constants, Functional Results derived along different functional paths, and Functional Results derived along the same functional path, but with different input parameters, each generate a unique signature.

As an example of the intended meaning of these terms, the Functional Result designated as (e) in FIG. 1 is computed as E(B(x,y)). That is, the Functional Result (e) results from the application of the Function E to the first result (b0) of the Function B, which operates on the Input Constants (x) and (y). Function B has two outputs, b0 and b1, with b0 indicating the first result computed by Function B and b1 indicating the second result computed by Function B.

As was previously noted, the invention does not specify any one specific signature function or signature-determining algorithm, but rather the assigning of unique signatures to input data, these signatures thereafter being combined to derive signatures for functional results.

SIGNATURE DETERMINATION OF INPUT CONSTANTS

An input constant is characterized by several attributes. These include the data type, e.g. character, integer, single-precision floating point, double-precision floating point; the category, or mathematical field from which the constant is drawn, e.g. real, complex, quaternion, etc.; the rank or dimensionality of the constant; and, if the constant is multidimensional, e.g. vectors, matrices, and tensors, the size of the constant in each dimension. In addition to the constant's attributes, which are independent of a constant's actual value, an input constant is also characterized by its value, which may be defined as the bits or bytes used by the system 10 to represent the value.

The following illustrates several examples of input constants and attributes associated with each.

| | |
|---|---|
| Constant 1: | "this is a string constant" |
| Attributes: | Data Type: character |
| | Category: Real |
| | Rank: 0 |
| | Dimensions: |
| Constant 2: | [(0.1, 1.0) (0.2, 2.0) (0.3, 3.0)] |
| Attributes: | Data Type: single-precision floating point |
| | Category: complex |
| | Rank: 1 |
| | Dimensions: 3 |
| Constant 3: | $\begin{bmatrix} 1 & 2 & 3 \\ 4 & 5 & 6 \end{bmatrix}$ |
| Attributes: | Data Type: integer |
| | Category: real |
| | Rank: 2 |
| | Dimensions: 2,3 |

Given this characterization, a particular constant's signature may be defined as the function:

$$S_c(\text{type, category, rank, dimensions, data}),$$

where type, category, and rank are as described above, where dimensions is a variable length list of the sizes in each dimension, and where data is the actual data used to represent the constant.

Any generator that incorporates these elements, or intermediate representations or encodings thereof, may be employed as an input constant signature generator. Thus, a simple character string concatenation of the alphanumeric form of each of these items may serve as a signature generator. While this approach may be effective for small constants, it tends to produce signatures that are effectively unbounded in size for large constants, e.g. multidimensional tensors with large sizes of each dimension.

Preferably, the method employs a constant signature generating function that combines all of the attributes of a constant into a single, fixed size number.

A presently preferred input constant signature generator computes a CRC polynomial of the constant value and the attributes associated with same. In this manner an input constant's characterization and its value-representing data are merged together into an effectively unique, fixed-size signature. Thus, $$S_c = CRC(\text{type, category, rank, dimensions, data}),$$

where the CRC function, with (n) inputs, is defined with the following recurrence relation:

$$CRC_1(i_1) = crc(i_1, -1), \text{ or}$$

$$CRC_n(i_1, i_2, \ldots, i_n) = crc(i_n, CRC_{n-1}(i_1, i_2, \ldots, i_{n-1})).$$

The function 'crc' computes the CRC polynomial of a previous CRC polynomial, which is initialized to $-1$, and a data item. The initialization to $-1$ is a convenience in that a two's complement representation of data is preferably employed, resulting in an initialized item being represented with all ones. In the case of the type and category attributes an encoding of this information is preferably performed. This encoding is accomplished through the use of character strings or unique numeric assignments. In the case of the rank attribute, the actual numeric value is encoded. Similarly, the dimensions are encoded as the numeric sizes associated with each dimension. Finally, the determination of the CRC of the data is accomplished by applying the CRC polynomial function to the binary representation of the data.

SIGNATURE DETERMINATION OF FUNCTIONAL RESULTS

In accordance with an aspect of the invention the signature associated with a Function's outputs is a combination of (a) the Function's inputs, (b) the Function itself, and (c) the identity of the Function's output, that is, which output if the Function generates multiple outputs, as does Function B in FIG. 1. From this definition it can be seen that a signature of a Function incorporates all of these elements, and need not incorporate any others. Thus, for a Function with n inputs, $i_1, i_2, \ldots, i_n$, the signature of the Function's outputs requires (n+2) inputs and may be defined as:

$$S_f(\text{name, out}, i_1, i_2, \ldots, i_n),$$

where "name" is the Function's name, or rather a signature of the name generated by treating the name as a character string input constant, as described above, and "out" is an index of the output of the Function being assigned the signature. As employed herein, the index 0 is considered to be the first output, the index 1 is considered to be the second output, etc.

Any signature generator capable of incorporating all of these elements may be used as a Function signature generator. As for the case of the Input Constant signature generator discussed previously, a simple string concatenation by the processor 12 of the alphanumeric form of each of these items may serve as a signature generator. However, this form of a Function signature generator results in an explosive growth in the size of the Function signatures, especially for Functions lower-down in a network, such as Function G.

As a result, a preferred embodiment of the Function signature generator employs the CRC generator 14 to determine the CRC polynomial of the Function's attributes. In this manner a particular Function's name, output identifier, and inputs are merged together into an effectively unique, fixed-size signature. Thus, $$S_f(\text{name, out}, i_1, i_2, \ldots, i_n) = CRC_{n+2}(\text{name, out}, i_1, i_2, \ldots, i_n).$$

It should be noted that the actual data to be input to a Function need not exist for the signatures of the Function's outputs to be generated. That is, all that is required is that the signatures of the Function's inputs exist at the time that the signature of the Function is generated.

Having thus described the preferred embodiments of the signature generators for constants and Functions, there is now described a presently preferred method of using the generated signatures.

The Dictionary Controller 18 and Dictionary 20 cooperate to insert, delete, enumerate, and search for signatures and their associated data elements. The Dictionary 20 is preferably implemented as a data structure stored within a memory of the system 10. The Dictionary Controller 18 operates in response to input from the data processor 12.

DICTIONARY INSERTION

Figure 3:
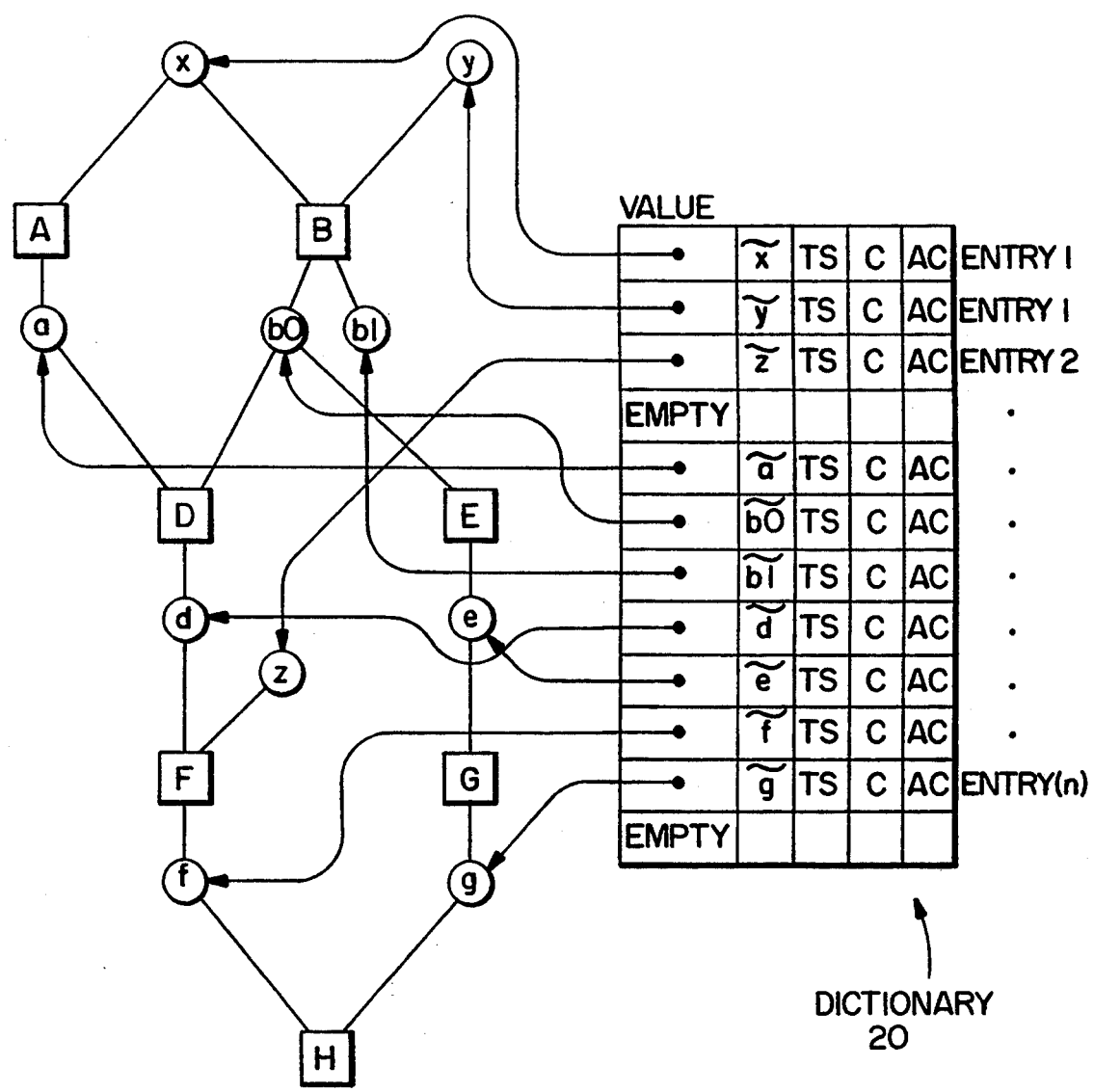
FIG. 3 shows in greater detail a relationship between signatures and data elements stored within a dictionary and nodes of the DAG of FIG. 1.

As seen more clearly in FIG. 3, insertion into the Dictionary 20 associates a "key" with an element of data, or Value. A signature, determined in accordance with one of the foregoing methods, is employed as the key. The data element may be, by example, an integer, character, or string of characters. For this case, the key and an associated constant are both stored within the Dictionary 20. For the more complex cases, where the key is associated with, by example, a floating-point constant or a hierarchical, linked data structure, the data element is an integer that functions as a pointer to a location within the DES 16. In either case, a subsequent identification of a desired key provides access to the associated data or data structure.

DICTIONARY DELETION

Deletion removes a data item, associated with a specified signature or key, from the Dictionary 20, and optionally invokes a system deletion function to release memory.

DICTIONARY SEARCH

Searching operates with a signature as a key and returns either (a) the data that was associated with that key by a previous insertion, or (b) an indication that no key was found that corresponds to the input signature. Searching compares an input signature to the keys stored within the Dictionary 20 to locate an exact match. If a matching key is found, the associated data element is accessed. If the data element is a pointer, the DES 16 is accessed to obtain the stored information.

DICTIONARY PURGING

The Dictionary 20 also accommodates a method of enumerating each currently stored element to support a purging operation. Purging may be accomplished to provide free space and/or to remove entries that meet certain criteria. The purging operation may take into account the cost of computing the data associated with each signature, the last time an element was accessed, and other parameters. To this end additional information is associated with each item entered into the Dictionary 20, the additional information being subsequently modified and updated during the use of the Dictionary 20.

An aspect of Dictionary Deletion and Dictionary Purging is memory reclamation. Memory reclamation is preferably accomplished by interpreting additional information associated with the signature. This is particularly useful when the stored data structures are not simple linear arrays or constants. To this end additional information is associated with each key. One element of this additional information is a time stamp (TS) indicating a time when the data element associated with a signature was last accessed. Further information may also be provided. For example, a "cost" (C) expressed in, by example, computation time, can be associated with each key. As a further example, an access count (AC) may also be provided.

Based on this information a Least Recently Used (LRU) type of memory reclamation procedure may be executed by the Dictionary Controller 18, or the processor 12, to determine which Dictionary 20 entries to remove. The LRU technique may consider only the time stamp information, so as to remove entries from the Dictionary 20 that have not been accessed within some predetermined interval. By employing the other information, the LRU technique may also consider the cost information. For example, a computationally expensive entry may be retained at the expense of a more recently accessed, but less computationally expensive, entry. Furthermore, the access count information may be employed to retain a frequently accessed entry at the expensive of a less frequently accessed entry that has, however, been accessed more recently than the former.

As was previously stated, a preferred embodiment for the Dictionary 20 is a hash table that maintains, in addition to the data elements associated with each key, the items of additional information (TS, C, AC) previously described.

Figure 4:
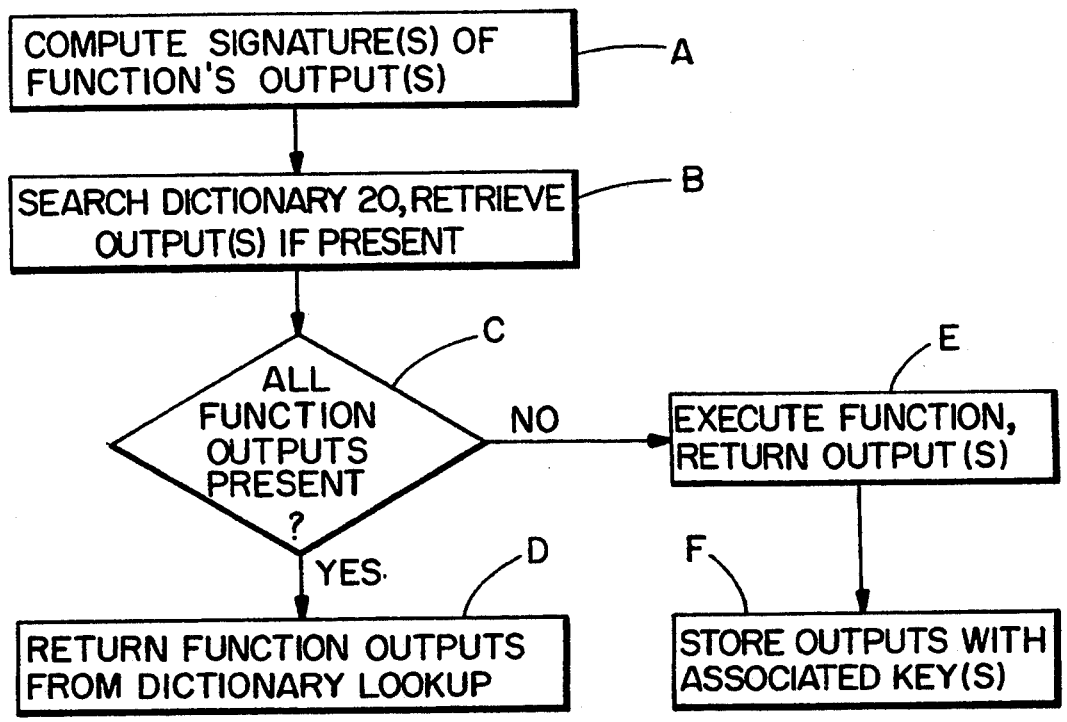
FIG. 4 is a flowchart depicting the use of the dictionary during the execution of a Function.

The teaching of the invention may be employed in several manners. By example, and referring to the flowchart of FIG. 4, a first application of the invention is in a runtime environment where, before executing a Function, the signatures of each of its outputs are computed (Block A), and the Dictionary 20 is searched to retrieve the data elements associated with each signature (Block B). If the data elements are found to all exist in the Dictionary 20 (Block C), then the Function need not be executed, and the retrieved data items are simply returned to the caller of the Function (Block D). If one or more of the data elements are found not to exist in the Dictionary 20 at Block C, then the Function is executed, and the computed data items are returned to the caller of the Function (Block E). The data items may also be inserted into the Dictionary 20 or DES 16, along with their respective keys (Block E).

Figure 5:
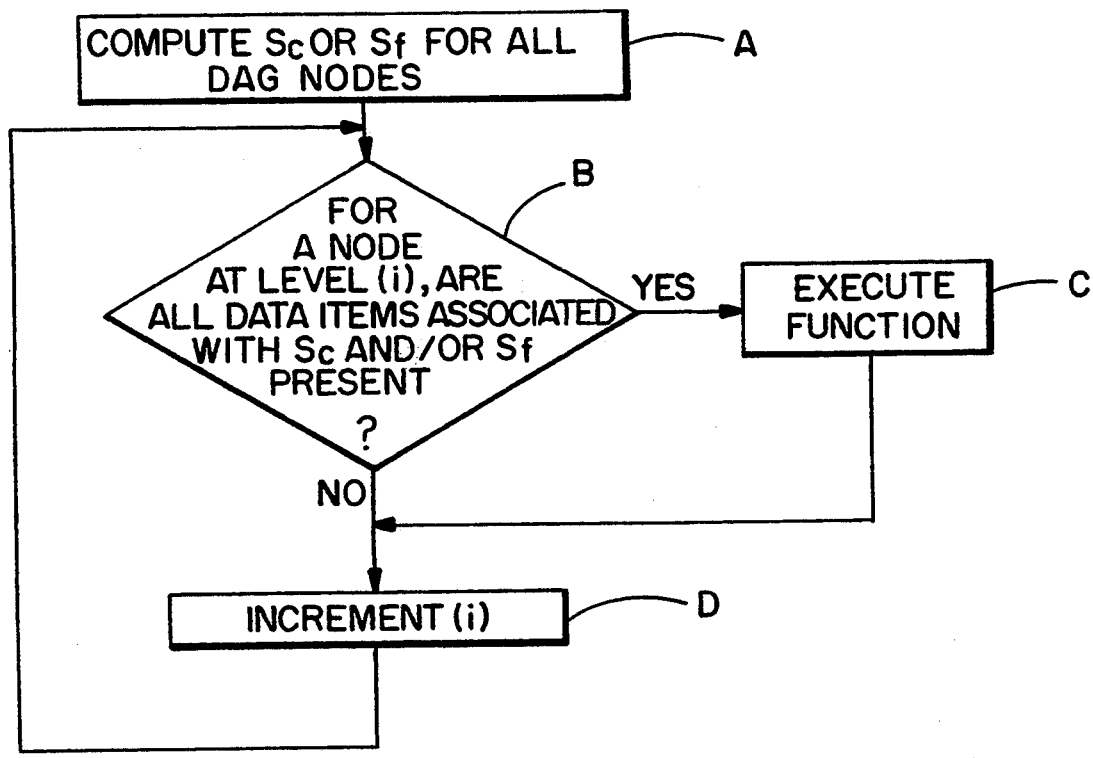
FIG. 5 is a flowchart depicting the use of the dictionary in evaluating the DAG of FIG. 1.

Reference is now made to the flowchart of FIG. 5 as showing an example of the use of the invention in evaluating the DAG of FIG. 1. When performing the evaluation of the DAG to determine which functions must be executed first, there is first computed, at Block A, the signatures of all of the data nodes in the DAG (e.g. x, y, z, a, b0, b1, d, e, f, and g of FIG. 1). Since x, y, and z are constant inputs, $S_c$ is applied, as described above, to determine their signatures' $\tilde{x}$, $\tilde{y}$, and $\tilde{z}$. Given these values, the signatures of the Function outputs are computed in accordance with $S_f$. That is, node a's signature $\tilde{a}=S_f(a, 0, x)$, node b0's signature $\tilde{b0}=S_f(B,0,x,y)$, and node b1's signature $\tilde{b1}=S_f(B, 1, x, y)$, are each computed. Then, signatures for the lower nodes d and e are computed, and then those for nodes f and g. As the signatures are computed, a "placeholder" data structure, effectively a level of indirection which allows actual data to be filled in at a later time, is inserted into the Dictionary 20, or DES 16, with each of the associated signatures.

After the signatures are computed, there is performed at Block B a bottom-up traversal of the DAG. This entails, at each functional node, a search of the Dictionary for the data items associated with the signatures of the inputs. If all of these data items are found, and if all are either constants or previously computed results, then the Function is scheduled for execution (Block C). Otherwise, the method recursively examines, at Blocks D and B, nodes further up the DAG so as to determine the required constants or results required by the lower node or nodes, such as the Function G.

It should be realized that the Block B of FIG. 5 is not intended to represent that a breadth-first search of all nodes on a given level is performed. Instead, the method is applied to specified nodes.

The following presents, in relation to FIG. 3, an example of the use of the invention for the exemplary DAG of FIG. 1.

| let: | x = 1.0 = (single-precision, real, 0) |
| | y = [1,2] = (integer, real, 1,2) |
| | z = (1,2) = (integer, complex, 0) | using an encoding scheme employing numeric assignments to represent:
integer=2, single-precision=3
real=1, complex=2,
there are obtained the following signatures:

$\tilde{x}=aae512df=S_c(3, 1, 0, 0\times3f800000)$ $\tilde{y}=e6964559=S_c(2, 1, 1, 2, 0\times0000000100000002)$ $\tilde{z}=f6d6cb02=S_c(2, 2, 0, 0\times0000000100000002)$ from which there is derived the following Function signatures:

$\tilde{a}=31044b39=S_f("A", 0, x)$ $\tilde{b0}=a7b21928=S_f("B", 0, x, y)$ $\tilde{b1}=4c175547=S_f("B", 1, x, y)$ $\tilde{d} = eed46cd6 = S_f(\text{``D''}, 0, a, b0)$ $\tilde{e} = 35c6397a = S_f(\text{``E''}, 0, b0)$ $\tilde{f} = cb830d1c = S_f(\text{``F''}, 0, d, z)$ $\tilde{g} = 472eaf93 = S_f(\text{``G''}, 0, e).$ It is noted that the foregoing Function signatures are determined without computing the Functions A, B, D, E, F, and G.

It is also noted that although FIG. 3 depicts the constant and Function signatures as being stored within the Dictionary 20 in a specific order, that the entries may typically be sorted and stored by their respective hexadecimal signature values. For the example given above, the resultant order is $\tilde{a}$, $\tilde{e}$, $\tilde{g}$, $\tilde{b}1$, $\tilde{b}0$, $\tilde{x}$, $\tilde{f}$, $\tilde{y}$, $\tilde{d}$, and $\tilde{z}$. Also, a full signature comparison is not required for all entries when accessing the Dictionary 20. For example, the least significant nybble of the search signature may be employed to obtain an enhanced search efficiency. For the example shown where the stored signatures for a and y have an identical least significant nybble (9), the corresponding Dictionary entry may have a pointer to entries for both $\tilde{a}$ and $\tilde{y}$. To further differentiate between these two entries a full signature (32 bit) comparison may be employed. With 32-bit signatures the probability of a collision occurring becomes small. However, it is within the scope of the invention to employ a 64-bit signature or to employ any number of bits so as to reduce the probability of a collision to a very small number.

The teaching of the invention is also amenable to the following optimizations. By determining post-dominators in the execution graph of the Functions to be performed, and only storing the results of these post-dominant functions, the number of elements in the cache (Dictionary 20) may be minimized. As an example, in FIG. 1 the intermediate result e is not stored, in that if Function G must be recomputed then Function E will also be required to be recomputed. However, intermediate result d is stored in that, although Function F may be recomputed, such may be accomplished because of a change in the constant z, while the intermediate result d remains unchanged.

Another optimization may be employed if a particular path of the DAG is determined to be constantly changing. This condition may occur if an input, for example the output of a counter, is changing monotonically. For this case the elements generated along the affected path are marked as non-cachable, thereby further reducing the number of elements stored in the Dictionary 20.

Also, although the invention has been described in the context of a specific graph, the DAG of FIG. 1, it should be realized that the teaching of the invention is applicable to any set of Function calls that operate upon inputs.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. For use in a digital data processing system of a type that repetitively evokes a set of Functions to process data, including one or more constants, a method comprising the steps of:

examining a constant to determine identifying characteristics thereof;

combining the characteristics with the value of the constant;

encoding the combination to obtain a Constant signature;

storing the Constant signature with a representation of the value;

for each Function of the set of Functions having input for which Constant signatures have been encoded, examining a Function to determine identifying characteristics of an output of the Function;

combining the characteristics with an identification of the Function and with signatures of the inputs to the Function;

encoding the combination to obtain a first Function signature;

storing the first Function signature; and, prior to executing a Function, performing the steps of, examining the Function to be executed to determine identifying characteristics of an output of the Function;

combining the characteristics with an identification of the Function to be executed and with signatures of the inputs to the Function to be executed;

encoding the combination to obtain a second Function signature;

determining if there exists a stored Function signature that equals the second Function signature; and if so, accessing a memory means to retrieve a value associated with the stored Function signature, otherwise executing the Function and storing the value returned by the Function with the signature of the Function.

2. A method as set forth in claim 1 wherein the step of examining a constant includes a step of determining a type, category, rank, and dimensionality of the constant.

3. A method as set forth in claim 1 wherein the steps of encoding each include a step of computing a CRC polynomial of the combination.

4. A method as set forth in claim 1 wherein the first step of encoding includes a step of concatenating a character string representation of the characteristics and the value.

5. A method as set forth in claim 1 wherein the first step of storing includes a step of creating an entry within a data structure, the entry including the Constant signature and the value of the constant.

6. A method as set forth in claim 1 wherein the first step of storing includes a step of creating an entry within a data structure, the entry including the Constant signature and a pointer to a storage location containing the value of the constant.

7. A method as set forth in claim 1 wherein the step of examining a Function includes the steps of determining an identity of all inputs to the Function, determining an identity of the Function output, and determining a name of the Function.

8. A method as set forth in claim 1 wherein the step of encoding the combination to obtain a Function signature includes a step of concatenating a character string representation of the identifying characteristics of the Function and the identification of the Function.

9. A method as set forth in claim 1 wherein the step of storing the Function signature includes a step of creating an entry within a data structure, the entry including the Function signature and the representation of the output of the Function.

10. A method as set forth in claim 1 wherein the step of storing the Function includes a step of creating an entry within a data structure, the entry including the Function signature and a pointer to a storage location of the output of the Function.

11. A method as set forth in claim 1 wherein the step of accessing includes a step of storing a time stamp indicative of a time that the access occurs.

12. A method as set forth in claim 1 wherein the step of accessing includes a step of incrementing a count indicative of a number of times that the associated output of the Function is accessed.

13. A method as set forth in claim 1 wherein the step of storing the first Function signature further includes a step of storing a cost associated with executing the function so as to obtain the output of the Function.

14. A method as set forth in claim 11 wherein the method further includes a step of selecting a stored Function signature for removal from a means that stores the Function signature, the selection being accomplished in accordance with a Least Recently Used criteria.

15. A method as set forth in claim 14 wherein the step of storing a time stamp includes a step of incrementing a count indicative of a number of times that the associated output of the Function is accessed, and wherein the Least Recently Used criteria also considers a value of the count.

16. A method as set forth in claim 14 wherein the step of storing a time stamp further includes a step of storing a cost associated with executing the Function to obtain the output of the Function, and wherein the Least Recently Used Criteria also considers the stored cost.

17. Apparatus for use in a digital data processing system of a type that repetitively evokes a set of Functions to process data, including one or more constants, comprising:

means for examining a functional network comprised of a plurality of functional nodes each representing a network Function, at least one of said functional nodes having an input for receiving input data, at least one of said functional nodes having an output for outputting, to an input of another functional node, an intermediate result of an execution of the associated network Function, said examining means including means for examining one or more network constants to determine identifying characteristics thereof, said constant examining means including means for combining the characteristics with a value of a network constant to obtain a first combination, said examining means further including means for examining one or more network Functions to determine identifying characteristics of an output of each network Function, said Function examining means including means for combining the characteristics with an identification of a network Function and with signatures of the inputs to the network Function to obtain a second combination;

means for encoding the first combination and the second combination to obtain a Constant signature and a Function signature, respectively;

means for storing the Constant signature and the Function signature in association with a representation of a value of the network constant and with a representation of an output of the network Function, respectively; and means, responsive to a network Function being called for execution, for accessing the storing means with a Constant signature or with a Function signature to obtain the stored representation of the value of a corresponding network constant or the stored representation of the output of a corresponding network Function, respectively.

18. Apparatus as set forth in claim 17 wherein said storing means includes hash table means having a plurality of hash cells for storing said Constant signatures, Function signatures, and associated representations.

19. Apparatus as set forth in claim 18, wherein said accessing means includes means for addressing said hash table means with a Constant signature or a Function signature.

20. Apparatus as set forth in claim 17, wherein said accessing means further includes means for accessing the storing means with a Constant signature or a Function signature so as remove from the storing means a stored entry having a signature that equals the Constant signature or the Function signature.

21. Apparatus as set forth in claim 17 wherein said encoding means includes CRC generating means.

22. Apparatus as set forth in claim 17 wherein said accessing means includes means for time stamping an accessed Constant signature or Function signature with a time that the access is made.

23. Apparatus as set forth in claim 17 and further including memory means for storing a value of a network constant or a value of a network Function output, and wherein the stored representation includes a pointer to a location within the memory means wherein the associated value is stored.

24. Apparatus as set forth in claim 17 wherein the combining means of the network constant examining means obtains the first combination as a constant signature ($S_c$) in accordance with the expression:

$$S_c(\text{type, category, rank, dimensions, data}),$$

and wherein the combining means of the network Functions examining means obtains the second combination as a Function signature ($S_f$) in accordance with the expression:

$$S_f(\text{name, out, } i_1, i_2, \ldots, i_n);$$

wherein $i_1, i_2, \ldots, i_n$ are inputs to a network Function being examined.

25. A method for use in a digital data processing system of a type that repetitively evokes a set of Functions to process data, including one or more constants, comprising the steps of:

operating the digital data processing system to examine a functional network comprised of a plurality of functional nodes each representing a network Function, at least one of said functional nodes having an input for receiving input data, at least one of said functional nodes having an output for outputting, to an input of another functional node, an intermediate result of an execution of the associated network Function, the step of operating the digital data processing system being comprised of the steps of, inputting at least one network constant;

examining the at least one network constant to determine identifying characteristics thereof and combining the determined identifying characteristics with a value of the at least one network constant to obtain a first combination;

inputting at least one network Function;

examining the at least one network Function to determine identifying characteristics of an output of the at least one network Function and combining the determined identifying characteristics with an identification of the at least one network Function and with signatures of inputs to the network Function to obtain a second combination;

inputting the first combination and the second combination to an encoder; encoding with the encoder the first combination and the second combination to obtain at an output of the encoder a Constant signature and a Function signature, respectively; and storing, within a memory means, a plurality of items that include the Constant signature and the Function signature that are output from the encoder, the Constant signature and the Function signature being stored in association with a representation of a value of the at least one network constant and with a representation of an output of the at least one network Function, respectively; wherein the first combination is obtained as a constant signature ($S_c$) in accordance with an expression having at least the elements of:

$S_c$(type, category, rank, dimensions, data), and wherein the second combination is obtained as a Function signature ($S_f$) in accordance with an expression having at least the elements of:

$S_f$(name, out, $i_1, i_2, \ldots, i_n$);

where $i_1, i_2, \ldots, i_n$ are inputs to the at least one network Function.

26. A method as set forth in claim 25, and prior to executing an evoked network Function, performing the step of accessing the memory means with a Constant signature or a Function signature so as to obtain, if available, the stored representation of the value of a corresponding network constant or the stored representation of the output of a corresponding network Function, respectively.

27. A method as set forth in claim 25 and further including the step of periodically purging the memory means to remove an item or items that meet one or more predetermined criteria.

28. A method as set forth in claim 27 wherein the one or more predetermined criteria are selected from the group consisting essentially of a time of last access, an access count, a computational cost, and combinations thereof.

* * * * *